United States Patent [19]
Roll et al.

[11] Patent Number: 5,388,174
[45] Date of Patent: Feb. 7, 1995

[54] OPTICAL FIBER CONNECTOR TECHNIQUES

[75] Inventors: Richard A. Roll, West Trenton; Muhammed A. Shahid, Ewing Township, Mercer County; George J. Shevchuk, Old Bridge, all of N.J.

[73] Assignee: AT&T Corp., Murray Hill, N.J.

[21] Appl. No.: 186,935

[22] Filed: Jan. 27, 1994

Related U.S. Application Data

[63] Continuation-in-part of Ser. No. 20,931, Feb. 22, 1993, Pat. No. 5,287,426.

[51] Int. Cl.$^6$ ............................................. G02B 6/38
[52] U.S. Cl. ................................... 385/80; 385/65; 385/71; 385/83; 385/114
[58] Field of Search ................................... 385/95–99, 385/114, 80, 59, 65, 83, 71, 136

[56] References Cited

U.S. PATENT DOCUMENTS

| | | | |
|---|---|---|---|
| 4,818,058 | 4/1989 | Bonanni | 385/71 |
| 5,259,051 | 11/1993 | Burack et al. | 385/76 |
| 5,268,981 | 12/1993 | Shahid | 385/71 |
| 5,287,426 | 2/1994 | Shahid | 385/85 |

OTHER PUBLICATIONS

"Plastics Engineering Handbook of the Society of the Plastics Industry, Inc.," Michael L. Berins, editor, Van Nostrand Reinhold, New York, 1991, pp. 179–232. No Month.

*Primary Examiner*—John D. Lee
*Assistant Examiner*—Phan Thi Heartney
*Attorney, Agent, or Firm*—Roderick B. Anderson

[57] ABSTRACT

A first optical fiber support member (30) is held in a first fixture (A first kVhaving a first alignment pin (40) extending therefrom perpendicularly to an optical fiber array (32) and also having a first alignment aperture (43). A second support member (31) is held in a second fixture (37) having a second alignment aperture (41) and a second alignment pin (42) extending therefrom perpendicularly to the optical fiber array. When the two support members are clamped on opposite sides of the optical fiber array, they are aligned by engaging the first alignment pin (40) with the second alignment aperture (41) and engaging the second alignment pin (42) with the first alignment aperture (43). With the support members clamped, fluid adhesive is applied through an aperture (61) to bond the support members (30, 31) and optical fiber array (32) together. The first and second support members (30, 31) are made of plastic and are made by plastic molding. As a consequence, a third alignment projection (50) and a third alignment aperture (52) can be made in the first support member (30), and a fourth alignment projection (51) and a fourth alignment aperture (53) can be made in the opposing face of the second support member (31). These projections are much smaller than the first and second alignment pins, and when the support members are clamped together, engagement of the third alignment projection with the fourth alignment aperture and engagement of the fourth alignment projection with the third alignment aperture gives a finer and more precise degree of alignment.

34 Claims, 4 Drawing Sheets

5,388,174

OPTICAL FIBER CONNECTOR TECHNIQUES

This application is a continuation-in-part of the application of M. A. Shahid, Ser. No. 08/020,931, filed Feb. 22, 1993, now U.S. Pat. No. 5,287,426, granted Feb. 15, 1994.

TECHNICAL FIELD

This invention Elates to optical fiber interconnections and, more particularly, to techniques for making optical connections to optical backplanes and optical fiber ribbons.

BACKGROUND OF THE INVENTION

The M. A. Shahid, U.S. Pat. No. 5,268,981, granted Dec. 7, 1993, hereinafter '981, describes a method for applying optical fiber connectors to optical backplanes of the type comprising optical fibers routed on a flexible plastic substrate. The optical fibers of each of the output tabs or output ports are contained between a pair of optical fiber support members on opposite sides of the fibers. The support members are made of a monocrystalline material, such as silicon, in which opposing V-grooves are made by photolithographic masking and etching for containing the fibers. It is essential that the optical fibers be contained at precise locations by the support members of a connector so that the optical fibers of another connector can be abutted against them such that light can be efficiently transmitted between the abutted fibers. Monocrystalline silicon support members suit this purpose because of the precision with which the V-grooves in such material can be made. The copending application of M. A. Shahid, Ser. No. 08/020,931, filed Feb. 22, 1993, now U.S. Pat. No. 5,287,426, granted Feb. 15, 1994 (hereinafter '426) describes how the same general technique can be used for applying connectors to optical fiber ribbons.

While the techniques of the Shahid '981 patent and the Shahid '426 patent have significantly reduced the time, expense and operator skill needed to provide interconnections to the output ports of optical backplanes and to optical fiber ribbons, forming and applying the connectors still constitutes a significant expense. Further, the silicon connectors are not amenable to automatic or robotic placement, as is desirable for mass production, because of their relative fragility and the difficulty of shaping-them along planes that do not correspond to their crystallographic planes. Making V-grooves in each individual support member by photolithographic masking and etching is, of itself, comparatively time consuming.

SUMMARY OF THE INVENTION

The invention is an improvement of a method for applying connectors to a parallel array of optical fibers that are adhered to and extend between first and second displaced substrate portions. The array of optical fibers is contained between a pair of optical support members on opposite sides of the array, and thereafter the support members and optical fiber array are cut transversely to the optical fiber array. The improvement comprises holding the first optical fiber support member in a first fixture having a first alignment aperture and a first alignment pin extending perpendicularly to the optical fiber array. The second support member is held in a second fixture having a second alignment aperture and a second alignment pin also extending perpendicularly to the optical fiber array. When the two support members are clamped on opposite sides of the fiber array, they are aligned by engaging the first alignment pin with the second alignment aperture and engaging the second alignment pin with the first alignment aperture. With the support members clamped, fluid adhesive is applied between the first and second support members and to the optical fibers to bond them permanently together.

An important aspect of the invention is that the first and second support members are made of plastic and are made by plastic molding. As a consequence, a third alignment projection and a third alignment aperture can be made in the first support member, and a fourth alignment projection and a fourth alignment aperture can be made in the opposing face of the second support member. These projections are much smaller than the first and second alignment pins, and when the support members are clamped together, engagement of the third alignment projection with the fourth alignment aperture, and engagement of the fourth alignment projection with the third alignment aperture, gives a finer and more precise degree of alignment. It had been thought previously that it would be difficult to mass produce plastic support members having matching V-grooves of the requisite precision and alignment. By intentionally making the mold slightly larger, in a manner that will be described in more detail later, one can compensate for inherent shrinkage of the plastic and obtain the required precision. Methods for rapidly and repeatedly applying connectors to a number of output ports of an optical backplane will be discussed.

These and other objects, features and advantages of the invention will be better understood from a consideration of the following detailed description taken in conjunction with the accompanying drawing.

DETAILED DESCRIPTION

Figure 1:
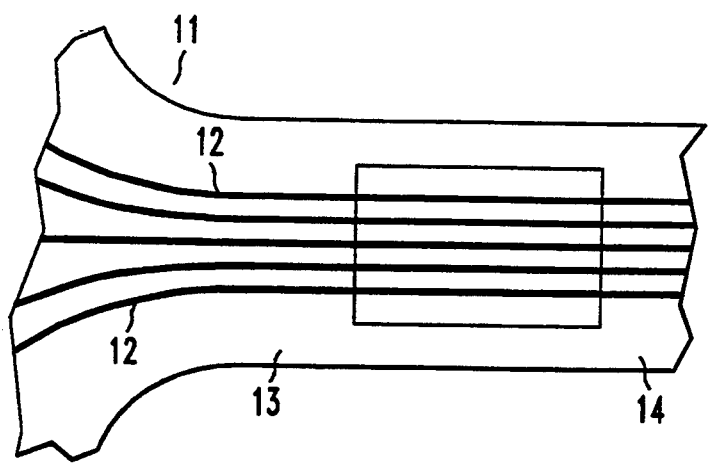
FIG. 1 is a schematic view of part of an optical backplane to which a connector is to be applied.

Referring now to FIG. 1, there is shown an output port of an optical backplane comprising a flexible plastic substrate 11 upon which have been adhered a plurality of optical fibers 12. An aperture has been made in the substrate 11 such that the optical fibers extend across the aperture between opposite substrate segments 13 and 14. In accordance with the aforementioned Shahid '981 patent, connectors can be applied to the output port of FIG. 1 by applying, on opposite sides of the optical fibers 12, first and second optical fiber support members 16 and 17, as shown in FIG. 2.

Figure 3:
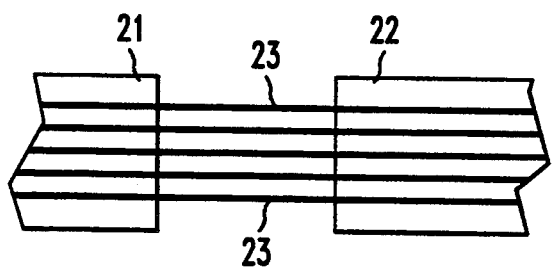
FIG. 3 is a schematic view of part of an optical fiber ribbon to which a connector is to be applied.

The support members 16 and 17 are conventionally made of a monocrystalline material, such as silicon, into which opposing V-grooves can be made with precision by photolithographic masking and etching. Etching of the material inherently progresses along crystallographic planes, which permits features to be formed with precise predictability. The support members 16 and 17 are also shown as having alignment grooves 18 and 19 on the sides thereof, which permit the mounting of alignment pins with a spring clip, as is described in Bonanni, U.S. Pat. No. 4,818,058, granted April 4, 1989, incorporated by reference herein (see especially FIG. 4 thereof). After the assembly shown in FIG. 2, the support members 16 and 17 and the optical fibers 12 may be severed by cutting transversely to the optical fibers, as described in the Shahid '981 patent, to provide a connector surface that can be subsequently connected or abutted to a similar connector surface of another connector for optical fiber interconnection. The aforementioned Shahid '426 patent describes how this technique can be applied to optical fiber ribbons, as shown in FIG. 3, in which an optical fiber ribbon comprises two displaced substrate portions 21 and 22 which are bridged by the optical fibers 23 that adhere to the substrate portions 21 and 22.

Figure 2:
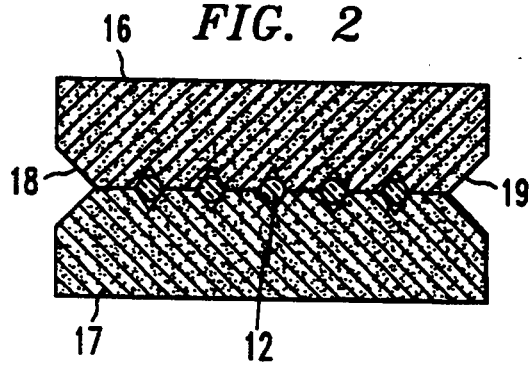
FIG. 2 is a schematic view of a connector that can be used for containing the optical fibers of FIG. 1.

The invention provides for machine placement of opposite optical fiber support elements of the type shown in FIG. 2. As will become clear later, machine placement of the support members is greatly facilitated by making them of plastic, rather than silicon. In particular, injection molding is used to make the opposite segments, which is a much less expensive process than masking and etching, and allows the formation of structural features such as fight-angle steps needed for precise alignment and placement.

Figure 4:
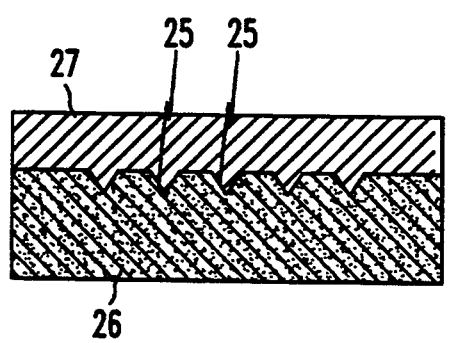
FIG. 4 is a schematic view of apparatus for making a plastic mold for making optical fiber connectors in accordance with one embodiment of the invention.

As illustrated in FIG. 4, the first step in this procedure is to make an array of V-grooves 25 in a monocrystalline body 26 such as silicon, by the conventional masking and etching process. This defines the V-grooves with the requisite precision. However, to allow for shrinkage of the plastic during the subsequent molding process, the V-grooves should be made somewhat larger than is finally intended for the final optical fiber support. A metal layer 27 is then electroformed over the V-grooves; thereafter, the silicon body 26 is removed or destroyed, as by etching it in, for example, a mixture of HF, HNO$_3$ and water (other known etchants of silicon could alternatively be used). The metal layer 27 is then used as an insert in a mold which defines the remaining configuration of the support members. That is, fiber support members are made by injection molding, using a mold having the metal layer insert in the portion of the mold defining the V-grooves of the support members being made.

Figure 5:
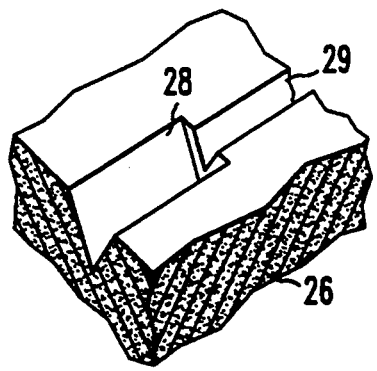
FIG. 5 is a perspective view of part of a V-groove of an optical fiber connector in accordance with one embodiment of the invention.

The optical fibers 12, to be supported as shown in FIG. 2, may be conventional glass optical fibers having a diameter of one hundred twenty-five microns. They may also be conventional glass fibers which are coated with a thin layer of polyimide to give them a total diameter of one hundred forty-five microns. If the optical fibers are coated with acrylate to have a total diameter of about two hundred fifty microns, as is often done for giving optical fibers greater protection, it will normally be necessary to strip the acrylate coating prior to mounting in a V-groove because such coatings are not dependably symmetrical with respect to the optical fiber; that is, the optical fiber core may be somewhat off-center with respect to the center of the acrylate coating, which will not allow proper mating to an abutting fiber for giving dependable interconnection. In such event, it is recommended that part of the V-groove be made sufficiently small to accommodate the stripped fiber and part of it be made larger to accommodate the coated fiber. This is illustrated in FIG. 5 in which V-groove portion 29 is sufficiently small to support an uncoated optical fiber, while the V-groove portion 28 supports the coated portion of the fiber. By supporting the coated portion in the optical fiber supporting member 26, as shown in FIG. 5, one avoids stresses on the fiber that would otherwise occur.

Figure 6:
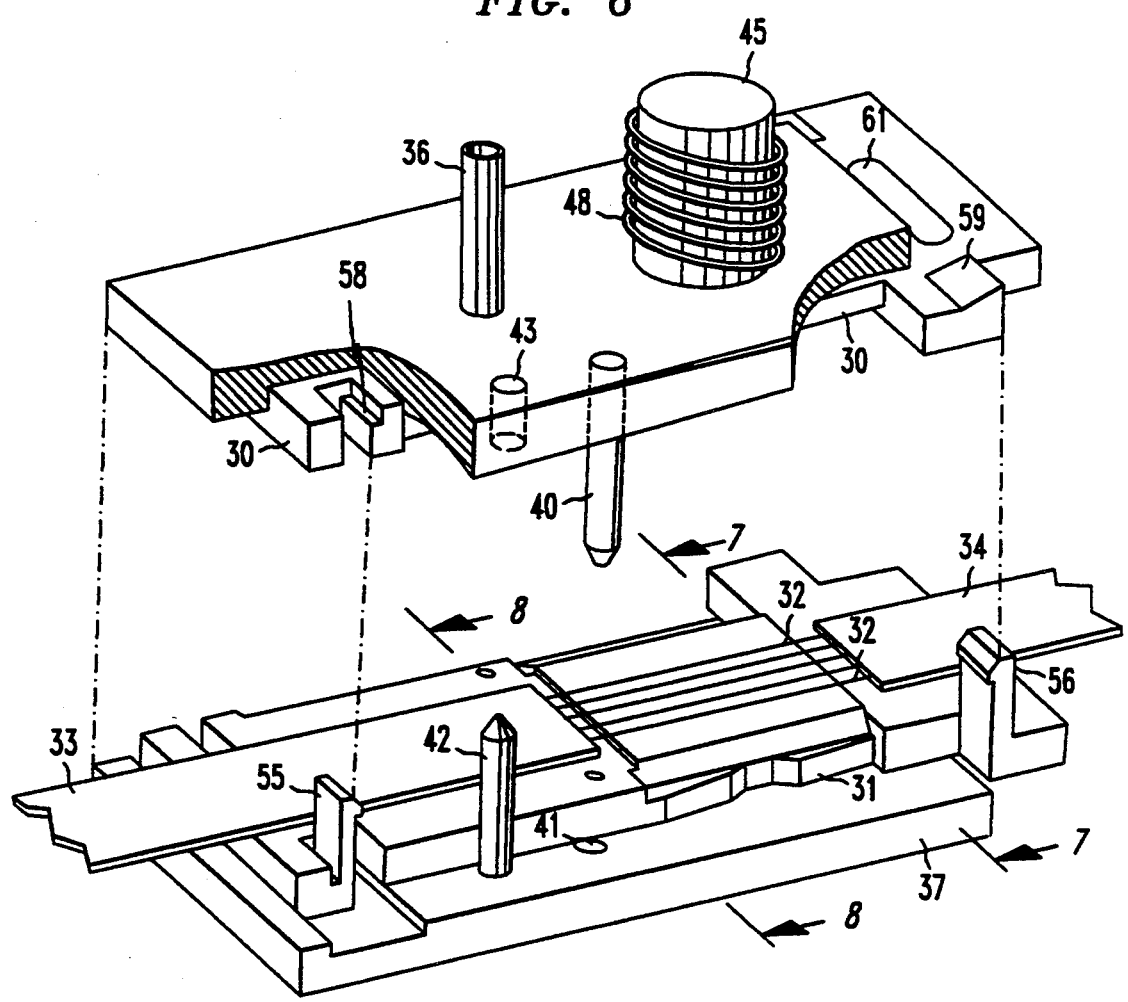
FIG. 6 is a schematic view of apparatus for applying connectors to an optical fiber ribbon in accordance with one embodiment of the invention.
Figure 7:
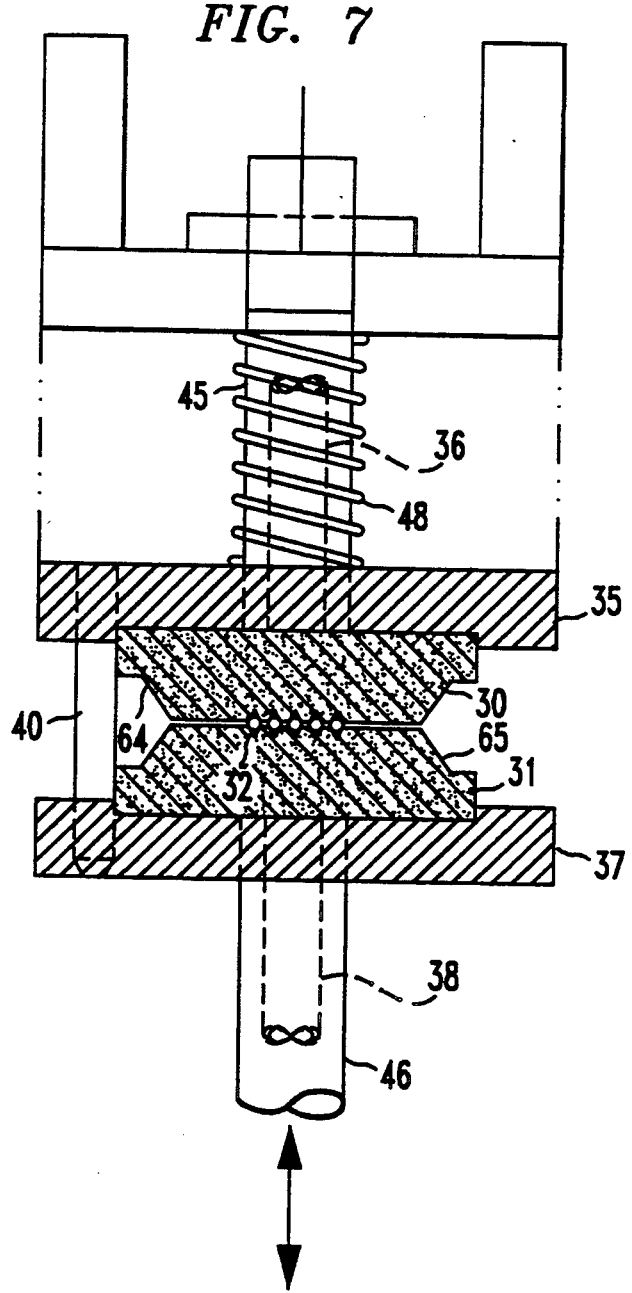
FIG. 7 is a sectional view taken along lines 7—7 of FIG. 6.

Referring to FIGS. 6 and 7, there is shown two optical fiber support members 30 and 31 located on opposite sides of an array of optical fibers 32 which are suspended between portions 33 and 34 of an optical fiber ribbon, as described with reference to FIG. 3. Support members 30 and 31 are of plastic and have been made by injection molding, as described above. The support members have matching V-grooves, each for containing one optical fiber, as shown more clearly in FIG. 7. FIG. 6 shows the support members 30, 31 spaced apart prior to clamping on opposite sides of the optical fibers 32, while FIG. 7 shows the support members in their abutted positions.

The support member 31 is held within a vacuum chuck or fixture 35 by a vacuum applied through a duct 36. Similarly, support member 30 is held within a vacuum chuck 37 by a vacuum applied by means of duct 38. Vacuum chuck 37 has an alignment pin 42 and alignment aperture 41 while vacuum chuck 35 has an alignment pin 40 and alignment aperture 43. The optical fiber ribbon 33, 34 is supported by an X-Y stage (not shown) which places the fibers 32 between the support members 30 and 31 in alignment with matching V-grooves.

As shown in FIG. 7, press members 45 and 46 compress together support members 30 and 31 on opposite sides of the fiber so that each optical fiber 32 is contained within matching V-grooves of the two support members. A spring 48 on press member 45 limits the compressive force that can be applied to the support members 30 and 31 to avoid possible damage to the fibers or support members. As the two support members are being brought together, the alignment pins 40 and 42 respectively engage alignment apertures 41 and 43 to increase the precision with which support members are aligned.

Figure 8:
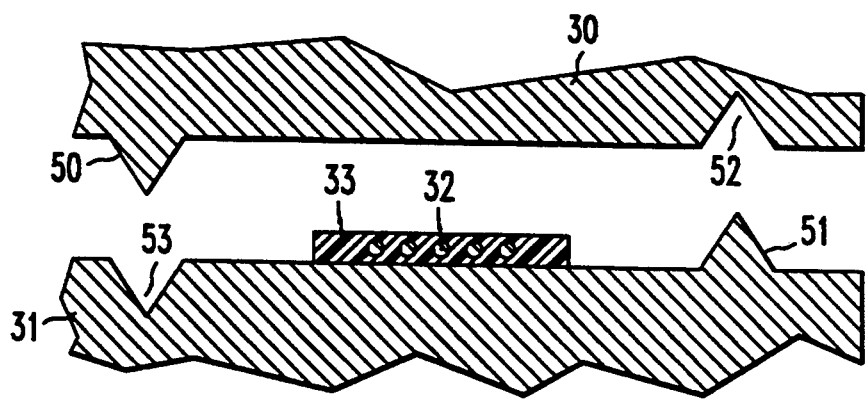
FIG. 8 is a fragmentary sectional view taken along lines 8—8 of FIG. 6.

Referring to FIG. 8, much smaller alignment projections 50 and 51 are included on the plastic support members 30 and 31 and respectively engage alignment apertures 52 and 53. The projections 50 and 51 and apertures 52 and 53 are made to be conical and are much smaller than alignment pins 40 and 42 in order to give finer precision alignment in the abutment of optical fiber support members 30 and 31. Illustratively, the maximum diameter of each projection 50 and 51 is less than one-tenth the diameter of alignment pins 40 and 42. Finally, the fibers 32 of FIG. 7 provide even finer alignment in that they tend to center themselves in abutting V-grooves as the support members 30 and 31 are pressed together.

The lower support member 31 is also made to include latch members 55 and 56 shown in FIG. 6. Latch member 55 is adapted to engage a latch step 58 of the upper support member 30, while latch member 56 is adapted to engage a latch step 59 in support member 30. The upper surfaces of latch members 55 and 56 are each curved to constitute a cam surface which deflects the latch member when it is brought in contact with the upper support member 30. When the support members 30 and 31 have been compressed together sufficiently, the inherent spring bias in the latch members 55 causes them to engage the step portions 58 and 59, thereby to lock together the upper and lower support members 30 and 31. Consequently, immediately after latching, the vacuum chucks 35 and 37 of FIG. 7 can be withdrawn, and the upper and lower support members 30 and 31 will remain firmly clamped against the optical fibers 32.

Figure 9:
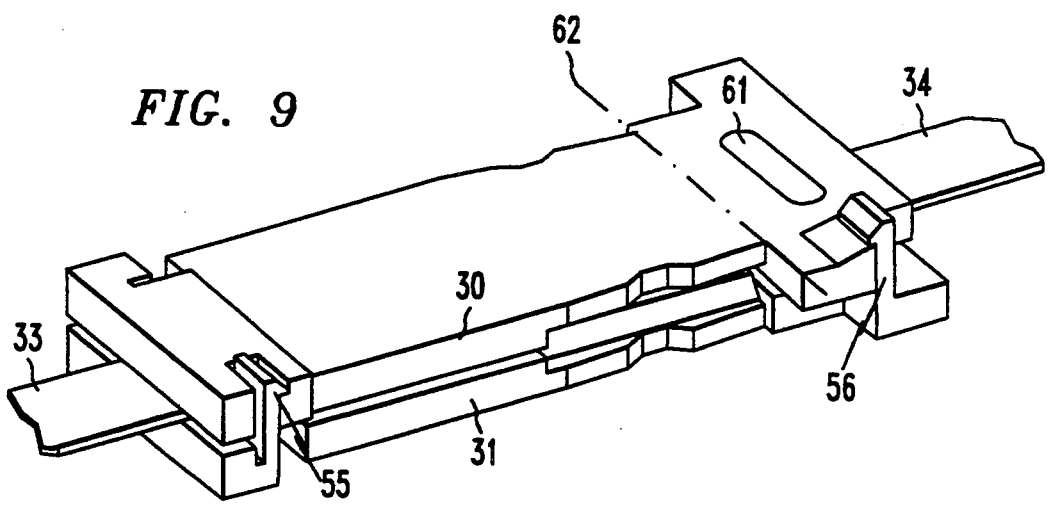
FIG. 9 is a perspective schematic view of an assembled optical fiber connector in accordance with one embodiment of the invention.

FIG. 9 shows the completed assembly comprising the two support members 30 and 31 on opposite sides of the optical fibers extending between optical fiber ribbon segments 33 and 34. Latches 55 and 56 hold the assembly together with each of the optical fibers 32 Contained within matching pairs of V-grooves, as shown in FIG. 7. The upper support member 30 contains an opening 61 into which liquid adhesive may be applied. With the adhesive being of a proper viscosity, it contacts the optical fibers 32 shown in FIG. 6 and propagates by capillary action along the optical fibers 32. Referring to FIG. 7, the adhesive also travels by capillary action along the tiny space between the support members 30 and 31. Thereafter, the adhesive is allowed to cure and bond together support members 30 and 31 and optical fibers 32; it should be noted that during this period the assembly has been removed from the machine apparatus of FIGS. 6 and 7, thus enabling the apparatus to be used for other purposes.

After the adhesive has cured, the bonded support members 30 and 31 and the intervening optical fibers are cut along a vertical plane 62 (FIG. 9), in the manner described in the Shahid '981 patent. The latch 56 is therefore cut away from the remaining assembly, but it is no longer needed because the support members and optical fibers have been bonded by the adhesive. The exposed ends of the optical fibers are then polished, and an alignment clip is placed around the assembly, as shown in FIG. 4 of the Bonanni patent. The clip holds alignment pins pressed against opposite sides of the support members 30 and 31. Referring to FIG. 7, one alignment pin is pressed against a V-groove 64 and the other pin against an opposite V-groove 65. The alignment pins pressed against sides 64 and 65 then allow the assembly to be used as a connector, that is, to be mated to an abutting connector for allowing transmission of light energy from the optical fibers of one connector to the optical fibers of the mating connector.

Figure 10:
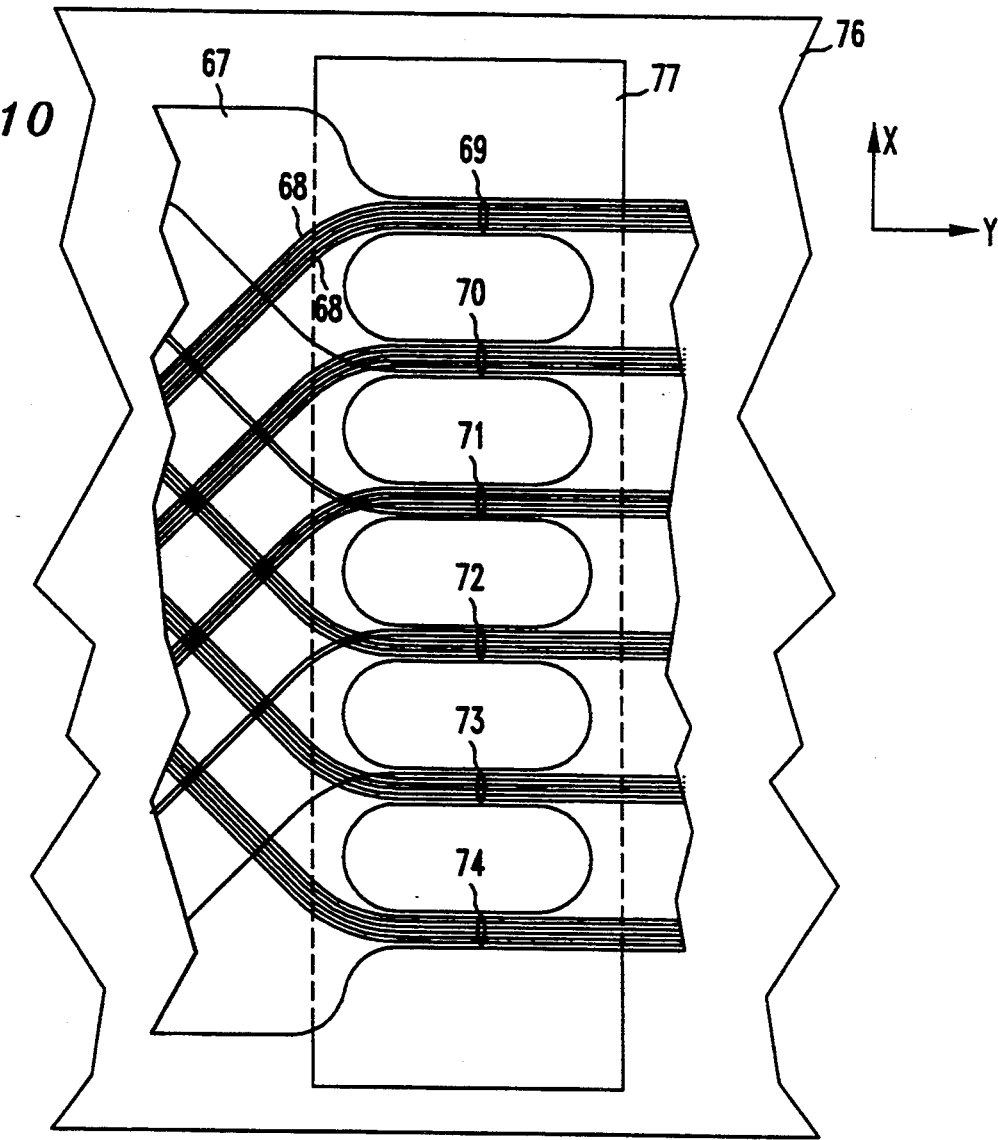
FIG. 10 is a top view of apparatus for applying connectors to an optical backplane in accordance with another embodiment of the invention.

FIG. 10 is a fragmentary top view of apparatus for applying connectors to an optical backplane 67 to which are adhered optical fibers 68 that have been routed such as to form output ports 69-74. The manner in which the optical fibers may be routed is described in detail in the patent of Burack et at., U.S. Pat. No. 5,259,051, granted Nov. 2, 1993, incorporated herein by reference. FIG. 7 of the Burack et al. patent shows why the output ports are formed as shown in the present FIG. 10. The optical backplane 67 is supported on a flat carrier plate 76 having therein an aperture 77 which the output ports 69-74 overlie. Each output port in rum has an aperture in its substrate, as shown in FIG. 1. The carrier plate is mounted on an X-Y stage (not shown) of a type known in the art which is capable of moving it in X and Y directions shown.

Connectors are successively applied to the output ports by the apparatus of FIGS. 6 and 7 which has access to opposite sides of the optical fibers by virtue of the aperture 77 in the carrier plate 76. After connectors have been applied to output ports 69 as has been described, the plate 76 is moved in the X direction so that output port 70 lies between the opposite vacuum chucks. Connector support members 30 and 31 are loaded in the vacuum chucks and then applied to the fibers of output port 70. In this manner, connectors are successively applied to all of the output ports by moving the X-Y stage successively in the positive X direction. The Burack et al. patent explains how all of the optical fibers 58 may initially be made of a single fiber to allow a single test to determine optical transmission characteristics of the fiber. With the present procedure, all of the support members can be applied prior to the test, with the fiber being severed after the test.

It can be appreciated that if a large number of identical optical backplanes are to be made, the process of applying connectors is greatly expedited by the use of the invention. Large numbers of support members identical to support members 30 and 31 arc made by injection molding. They can be loaded into a magazine, which has not been shown, for feeding support members 30 and 31 automatically to the vacuum chucks to avoid manual placement of the plastic support members after each operation. With a magazine thus provided for feeding the support members, the application of the connectors can be completely automated. Programming the operation of known X-Y stages to move the plate 75 sequentially with the precision required for each successive clamping operation is well within the skill of the worker in the art. The unique use of alignment pins and projections, as described before, insures actual alignment of the matching V-grooves with the individual optical fibers.

Known injection molding techniques provide the various surface features needed for abutment, for example, against the vacuum chucks 35 and 37 in a way that would be difficult if one were using materials such as silicon. The use of plastic also allows the fabrication of the conical alignment projections 50 and 51 and alignment apertures 52 and 53. Clearly, the latches 55 and 56 could not be incorporated as shown if the support members were made of material such as silicon. Techniques for making an appropriate mold for support member fabrication are known to workers in the art and described, for example, in the book, "Plastics Engineering Handbook of the Society of the Plastics Industry, Inc.," Michael L. Barons, editor, *Van Nostrand Reinhold,* New York, 1991. The use of a mold insert such as the metal member 27 of FIG. 4 is a well-known practice.

We have found that polyphenylene sulfide (PPS), polyetherimide and liquid crystal polymers, with appropriate fillers, have a relatively low mold shrinkage and could be used as the plastic material. The preferred material is PPS which has a shrinkage of-approximately 0.4 percent below the dimensions of the original silicon masters. Consequently, the dimensions of the silicon masters should be approximately 0.4 percent greater than the final desired dimension. For bonding the support members 30 and 31 together, any of various adhesives can be used, such as Epo-Tek 353ND, commercially available from Epoxy Technology, Inc., Billerica, Mass., which has an appropriate viscosity for allowing transport by capillary action, as described above.

The various embodiments described are intended merely to illustrate the inventive concepts involved. For example, a succession of optical fiber ribbons could be used in the apparatus of FIG. 10, rather than the succession of output ports 69–74. As described in the Shahid '981 patent, two abutting connectors can be simultaneously made by the apparatus of FIGS. 6 and 7 such that, referring to FIG. 9, they are separated by the cut along plane 62.

While electroforming has been described for depositing metal layer 27 of FIG. 4, other deposition methods such as vapor deposition could alternatively be used. Molding processes other than injection molding can be used for making support members 30 and 31. Clamping arrangements other than latches 55 and 56 of FIG. 9 could alternatively be used. The adhesive can be applied before the support members 30 and 31 are pressed together, if desired. Various other embodiments and modifications may be made by those skilled in the art without departing from the spirit and scope of the invention.

We claim:

1. A method for applying connectors to a parallel array of optical fibers that are adhered to first and second displaced substrate portions and which extend between the displaced substrate portions, comprising the step of containing the array of optical fibers between first and second optical fiber support members on opposite sides of said array and cutting transversely through the first and second support members and the optical fiber array:

holding the first optical fiber support member in a first fixture having a first alignment pin extending therefrom perpendicularly to the optical fiber array and a first alignment aperture;

holding the second optical fiber support member in a second fixture having a second alignment pin extending therefrom perpendicularly to the optical fiber array and a second alignment aperture;

aligning the first and second support members by engaging the first alignment pin with the second alignment aperture, and engaging the second alignment pin with the first alignment aperture;

applying fluid adhesive between the first and second support members and to the optical fibers and clamping together the first and second support members as the adhesive dries.

2. The method of claim 1 wherein:
the first and second support members are of plastic and are made by plastic molding.

3. The method of claim 2 wherein:
the first support member has a third alignment projection and a third alignment aperture;
the second support member has a fourth alignment projection and a fourth alignment aperture;
and the alignment step comprises engaging the third alignment projection with the fourth alignment aperture and the fourth alignment projection with the third alignment aperture.

4. The method of claim 3 wherein:
the first and second support members contain matching arrays of parallel grooves for containing the optical fiber array.

5. The method of claim 4 wherein:
the first and second optical fiber support members are each made by: (a) making an array of V-grooves in monocrystalline material by photolithographic masking and etching; (b) depositing metal on the V-grooves; (c) removing the monocrystalline material; and (d) using the deposited metal as mold portions for molding a plurality of identical support members.

6. The method of claim 5 wherein:
the distance between successive V-grooves in the monocrystalline material is initially made larger than the intended distance between successive V-grooves in the first and second support members to compensate for shrinkage of the plastic after injection molding.

7. The method of claim 5 wherein:
the plastic is predominantly polyphenylene sulfide.

8. The method of claim 2 wherein:
the first support member comprises a first latch element, and the second support member comprises a second latch element;
and after alignment of the first and second member, the first and second support members are forced together such that the first latch element engages the second latch element, thereby to perform the clamping step.

9. The method of claim 8 wherein:
the second latch element comprises an upper cam surface that is engaged when the first and second support members are forced together to deflect the second latch element, the second latch element then engaging a step of the first latch element and being forced against the step by a spring bias.

10. The method of claim 9 wherein:
the second support member contains an injection aperture extending therethrough;
and the step of applying adhesive comprises the step of injecting adhesive into the injection aperture such that the adhesive can contact the optical fiber between the first and second members.

11. The method of claim 10 wherein:
the first and second support members contain matching arrays of parallel grooves for containing the optical fiber array;
and the adhesive has an appropriate viscosity to move along the optical fibers by capillary action.

12. The method of claim 3 wherein:
the third and fourth alignment projections each has a maximum diameter of less than one-tenth the diameter of either the first or second alignment pins.

13. The method of claim 12 wherein:
the third and fourth alignment projections are substantially cone-shaped.

14. The method of claim 1 wherein:
the first and second displaced substrate portions are part of an optical backplane including a plurality of first and second displaced substrate portions arranged in a straight line with an array of optical fibers extending between each first and second displaced substrate portion;
supporting the optical backplane on a flat member having an elongated aperture such that each of the arrays of optical fibers overlies the aperture;
after the first and second support members have been applied to an array of optical fibers and before cutting the array of optical fibers to which they are applied, moving the flat member in the direction of the straight line until a second array of optical fibers lies between the first and second fixtures;

locating a second pair of support members in the first and second fixtures and using the first and second fixtures to apply the second pair of support members to the second array of optical fibers;

and successively repeating the moving, locating and applying steps to apply at least a third and fourth pair of support members respectively to third and fourth arrays of optical fibers.

15. The method of claim 14 wherein:

each array of optical fibers is substantially identical to each other array of optical fibers;

and each pair of support members is substantially identical to each other pair of support members.

16. The method of claim 15 wherein:

each pair of support members contains matching arrays of parallel grooves for containing the optical fiber array to which it is applied.

17. The method of claim 16 wherein:

each pair of optical fibers contains an injection aperture;

the step of applying adhesive comprises the step of injecting adhesive into the injection aperture such that the adhesive can contact the optical fiber contained by the pair of support members;

and the adhesive has appropriate viscosity to move along the optical fibers of the array by capillary action.

18. A method for applying optical fiber connectors to each of a plurality of arrays of optical fibers, each array being supported on a substrate and extending between first and second substrate portions, comprising the steps of:

supporting the substrates on a flat horizontal member having an aperture;

arranging the substrate such that all of the arrays are parallel and at least one of the arrays overlies the aperture;

locating respectively above and below the aperture first and second fixtures each adapted to hold a support member having therein an array of V-grooves;

placing a first pair of support members in the first and second apertures such that the arrays of V-grooves of the support members face the optical fiber array;

moving the substrate such that a first array of optical fibers is between the first pair of support members;

moving first and second fixtures together to clamp together the first pair of support members such that each optical fiber of the first array is held within matching V-grooves of the first pair of support members;

bonding together the first pair of support members with the first array of optical fibers contained therebetween;

moving the substrate such that a second array of optical fibers overlies the aperture and is located between the first and second fixtures;

using the first and second fixtures to apply a second pair of support members to the second array of optical fibers;

and thereafter cutting the optical fibers of the first and second arrays.

19. The method of claim 18 wherein:

prior to the cutting step, moving the substrate such that a third array of optical fibers is included between the first and second fixtures;

using the first and second fixtures to apply a third pair of support members to the third array of optical fibers;

and thereafter cutting the optical fibers of the first, second and third arrays.

20. The method of claim 19 wherein:

the first fixture has a first alignment pin extending therefrom perpendicularly to the flat horizontal member, and the second fixture has a second alignment pin extending therefrom perpendicularly to the flat horizontal member;

and when the first and second members are moved together, the first alignment pin engages a second alignment aperture of the second fixture, and the second alignment pin engages a first alignment aperture of the first fixture.

21. The method of claim 20 wherein:

each support member of each pair of support members contains, on the same surface that contains the V-grooves, an alignment projection and an alignment aperture;

each alignment projection being significantly smaller than each alignment pin;

and when each pair of support members are compressed together, the alignment projection of one support member engages the alignment aperture of the other support member.

22. The method of claim 21 wherein:

at least one support member of each pair of support members contains an injection aperture extending therethrough;

and after the first and second members of each pair are forced together, liquid adhesive is applied to the injection aperture to contact the array of optical fibers contained between the pair of support members, the adhesive having appropriate viscosity to propagate along the optical fibers by capillary action.

23. The method of claim 22 wherein:

one support member of each pair comprises a latch member and the other support member comprises a latch step;

and when the pair of support members are forced together, the latch member engages the latch step.

24. The method of claim 23 wherein:

the latch member comprises an upper cam surface that is engaged when the pair of support members are forced together to deflect the latch member, the first latch member engaging the latch step and being forced against the step by a spring bias.

25. The method of claim 24 wherein:

each support member is made by: making an array of V-grooves in monocrystalline material by photolithographic masking and etching; plating the V-grooves with metal; removing the monocrystalline material; and using the plated metal as a mold portion for making the support member by injection molding.

26. The method of claim 25 wherein:

each support member is made entirely of plastic, is made by plastic injection molding, and comprises predominantly polyphenylene sulfide.

27. A connector for supporting therebetween an array of optical fibers, comprising:

first and second support members each having on a first surface thereof a parallel array of grooves;

the grooves of the first and second support members adapted to contain therebetween an array of optical fibers;

the first surface of the first support member having an alignment projection adapted to engage an alignment aperture in the first surface of the second member to align together the first and second support members;

the first and second support members being substantially entirely of plastic and being made by plastic injection molding.

28. The connector of claim 27 wherein:

the alignment projection has a conical configuration and the alignment aperture has a conical configuration of the same dimension as that of the alignment projection.

29. The connector of claim 27 wherein:

each support member is made by: making an array of V-grooves in monocrystalline material by photolithographic masking and etching; depositing metal on the array of V-grooves; removing the monocrystalline material; and using the deposited metal as a mold portion for making the support member by molding.

30. The connector of claim 29 wherein:

the support members are made of a material selected from the group consisting of polyphenylene sulfide, polyetherimide, and liquid crystal polymers.

31. The connector of claim 30 wherein:

each support member is made of polyphenylene sulfide;

and the V-grooves made in the monocrystalline material are 0.4 percent larger than the grooves of the support member.

32. The connector of claim 27 wherein:

the first support member comprises a latch member and the second support member comprises a latch step;

the latch member being adapted to engage the latch step.

33. The connector of claim 32 wherein:

the latch member comprises an upper cam surface that is engaged when the first and second support members are forced together to deflect the latch member, the first latch member thereafter engaging the latch step and being forced against the latch step by a spring bias.

34. The connector of claim 33 wherein:

the alignment projection has a conical configuration, and the alignment aperture has a conical configuration of the same dimension as that of the alignment projection.

* * * * *